P. SCHERZER.
HARROW ATTACHMENT.
APPLICATION FILED JUNE 20, 1916.
1,211,358.
Patented Jan. 2, 1917.
2 SHEETS—SHEET 1.
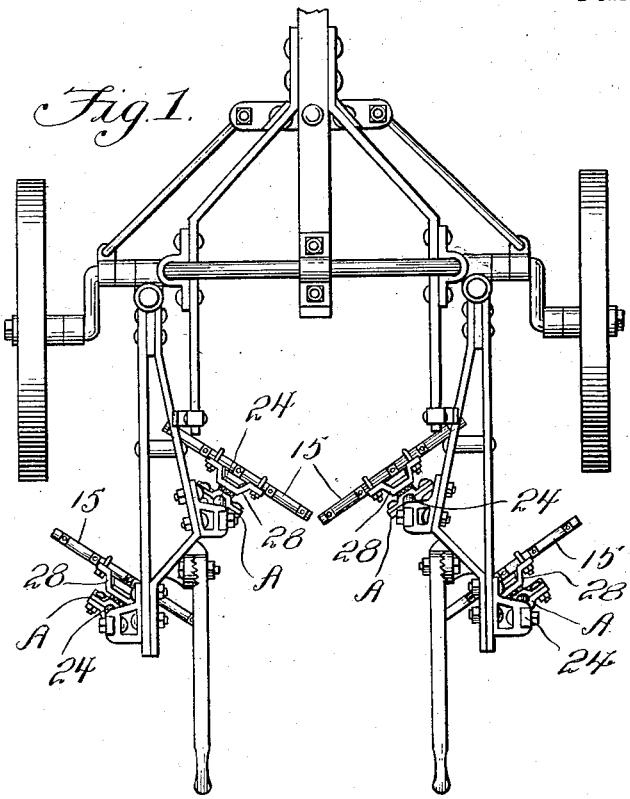
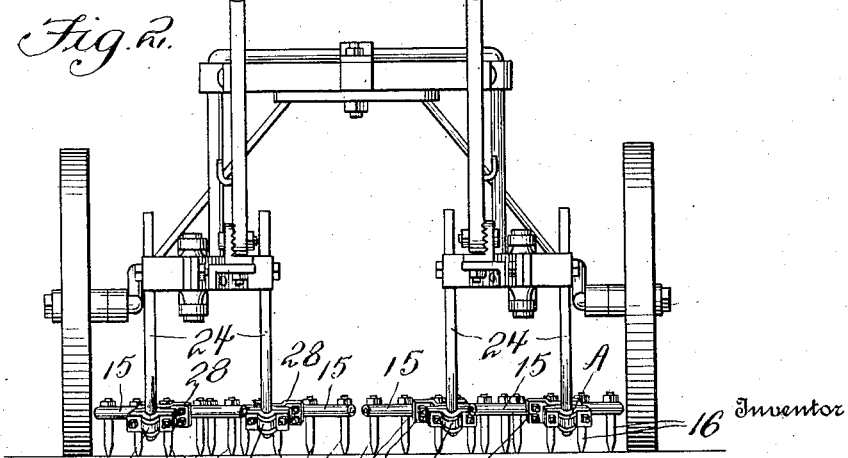

P. SCHERZER.
HARROW ATTACHMENT.
APPLICATION FILED JUNE 20, 1916.
1,211,358.
Patented Jan. 2, 1917.
2 SHEETS—SHEET 2.
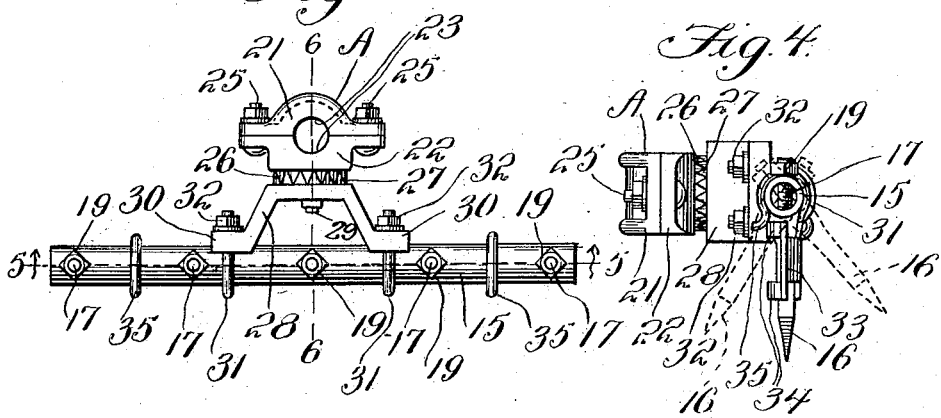
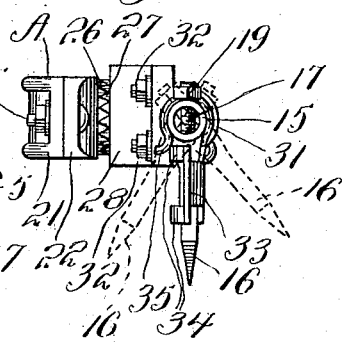
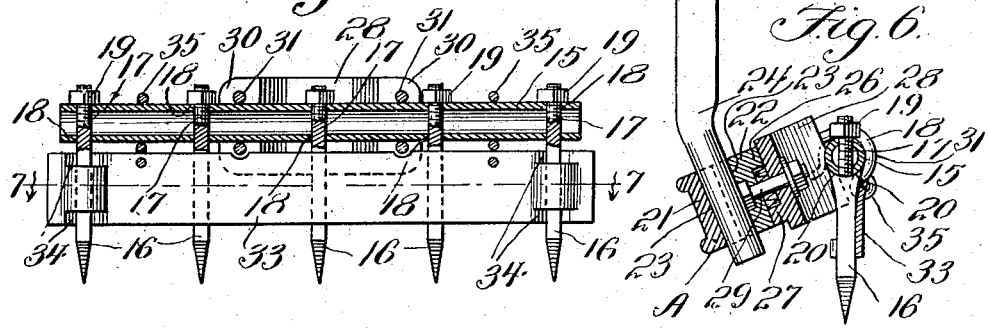
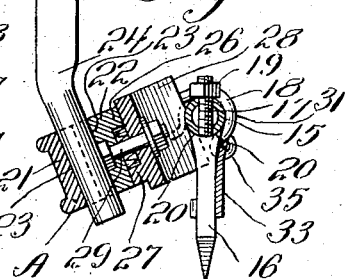
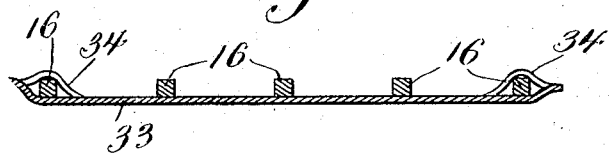
Inventor
P. Scherzer
By Victor J. Evans
Attorney
Witnesses
J. L. Wright

UNITED STATES PATENT OFFICE.

PHILIP SCHERZER, OF MELVIN, IOWA.

HARROW ATTACHMENT.

1,211,358.	Specification of Letters Patent.	Patented Jan. 2, 1917.

Application filed June 20, 1916. Serial No. 104,722.

*To all whom it may concern:*

Be it known that I, PHILIP SCHERZER, a citizen of the United States, residing at Melvin, in the county of Osceola and State of Iowa, have invented new and useful Improvements in Harrow Attachments, of which the following is a specification.

This invention relates to harrow attachments, and it has for its object to produce a harrow attachment of simple and improved form which may be conveniently attached to the standards or shanks of an ordinary cultivator to be used in place of the ordinary cultivator plows for the purpose of stirring and agitating the soil and working stalks or pieces of stalks remaining from previous crops, as well as other manure, into the ground in order to enrich and fertilize the soil.

A further object of the invention is to produce a simple and effective harrow attachment which may be conveniently adjusted in various ways to the most desirable and efficient position for operation.

A further object of the invention is to produce a harrow attachment having a simple and improved shield detachably connected therewith, whereby the surface soil may be moved toward or from the plants, as may be desired, simultaneously with the operation of the harrow.

A further object of the invention is to produce a simple and effective shield which may be readily connected with the harrow attachment.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a cultivator to the beams of which the improved harrow attachment has been applied. Fig. 2 is a rear elevation of the same. Fig. 3 is a top plan view of the harrow attachment equipped with the shield. Fig. 4 is an end view of the same. Fig. 5 is a sectional view taken on the line 5—5 in Fig. 3. Fig. 6 is a sectional view taken on the line 6—6 in Fig. 3. Fig. 7 is a vertical sectional view taken on the line 7—7 in Fig. 5.

Corresponding parts in the several figures are denoted by like characters of reference.

The improved harrow attachment is composed of a tubular bar 15 with which teeth 16 are connected, said teeth being provided with shanks 17 that extend through apertures 18 in the tubular bar, each shank 17 being threaded for the reception of a nut 19. Each shank is also provided with shoulders 20 abutting on the underside of the tubular bar, so that by tightening the nut 19 the teeth will be firmly secured in position.

A is a beam engaging clamp consisting of rear and front members 21, 22 having opposed grooves 23 to engage a cultivator standard 24 on which the clamp may be securely tightened by means of bolts 25 connecting the rear and front members 21, 22. The front member 22 has a radially serrated front face 26 engaging the correspondingly serrated rear face 27 of an arched bracket 28 which is connected with the clamp A by means of a bolt 29 that extends through the front member 22 of the clamp and through the bracket 28. The bolt 29 enables the bracket 28 to be secured at various angular adjustments with respect to the clamp A. The arched bracket 28 is provided with ears 30 that are apertured for the passage of U-shaped clips 31 in which the tubular harrow bar 15 is supported for rocking movement; the clips 31 being equipped with tightening nuts 32 whereby the tubular bar 15, having been rocked to the desired position, may be tightly clamped and secured.

A shield or guard plate 33, which may be constructed of sheet metal, is provided near the two ends thereof with struck up keepers 34 adapted to engage some of the harrow teeth 16; preferably the two teeth which are located at the two ends of the bar 15. The shield when mounted on the two end teeth 16, as seen in the drawings, will lie in contact with the front faces of the remaining or intermediate teeth, and the shield is provided with hooks 35 engaging the bar 15 for the purpose of suspending the said shield in position for operation. The shield may be of any desired width to permit a requisite portion of the harrow teeth to project below the lower edge thereof so as to be capable of entering into the ground in order to stir and agitate the soil.

In the operation of this invention one or more of the attachments may be used according to the number of standards with which the cultivator is equipped and also according to the results that it may be desired to produce. The clamp A is mounted on the cultivator standard and is adjusted about the axis of said standard to place the harrow bar 15 in the desired angular position with respect to the standard beam for the purpose of moving the surface dirt toward or from the row of plants to an intermediate position, substantially at right angles to the cultivator beam, if preferred. Tilting adjustment of the harrow bar may be had about the axis of the bolt 29. The harrow may be used without the shield 33, and it will then operate in the manner of an ordinary harrow, but when the shield is used it will be effective in moving the dirt, as described, and also in leveling the soil. By rocking the bar 15 about its axis in the supporting clips 31, the harrow teeth, as well as the shield, may be adjusted to a substantially vertical position, or the said teeth and shield may be tilted forwardly or rearwardly to any desired degree within the scope of movement, thus causing the lower edge of the shield to exercise a scraping or a smoothing and troweling action, as may be desired. The shield may be raised or lowered by shortening or lengthening the hooks or by using shorter or longer supporting hooks, thereby varying the length of the effective portions of the harrow teeth.

Having thus described the invention, what is claimed as new, is:—

1. In a harrow attachment for cultivators, a toothed harrow bar and a shield detachably connected therewith, said shield having struck up keepers engaging some of the harrow teeth.

2. In a harrow attachment for cultivators, a toothed harrow bar and a shield detachably connected therewith, said shield having struck up keepers engaging some of the harrow teeth; and means for suspending the shield with respect to the toothed bar.

3. In a harrow attachment for cultivators, a rockingly supported tooth carrying bar, a shield having keepers engaging some of the teeth of said bar, and bar engaging hooks connected with the shield to support the latter in raised position with respect to the points of the teeth.

In testimony whereof I affix my signature.

PHILIP SCHERZER.

Copies of this patent may be obtained for five cents each, by addressing the "Commissioner of Patents, Washington, D. C."